E. TALBOT.
PISTON.
APPLICATION FILED AUG. 27, 1910.

975,301.

Patented Nov. 8, 1910.

WITNESSES:
Edward Thorpe
C. W. Fairbank

INVENTOR
Ernest Talbot
BY Munn & Co.
ATTORNEYS

UNITED STATES PATENT OFFICE.

ERNEST TALBOT, OF NEW YORK, N. Y.

PISTON.

975,301.

Specification of Letters Patent.   Patented Nov. 8, 1910.

Application filed August 27, 1910. Serial No. 579,281.

*To all whom it may concern:*

Be it known that I, ERNEST TALBOT, a subject of the King of Great Britain, and a resident of the city of New York, borough of Manhattan, in the county and State of New York, have invented a new and Improved Piston, of which the following is a full, clear, and exact description.

This invention relates to certain improvements in pistons, and more particularly to pistons adapted for use in light internal combustion engines.

The object of my invention is to provide a construction of very small weight and great rigidity, with provision for easily securing a piston pin of small diameter. Incidentally, the bearing for the piston pin is removed to a considerable distance from the hot cylinder walls.

In my improved piston, I employ a cap portion which takes the pressure and carries the piston rings, and a trunk portion attached to the cap portion and carrying the piston pin brackets in the form of lugs projecting outwardly from the trunk. The trunk may, if desired, have a skirt portion attached thereto, to act as a guide for the lower end of the piston.

Reference is to be had to the accompanying drawings, forming a part of this specification, in which similar characters of reference indicate corresponding parts in both the figures, and in which—

Figure 1:
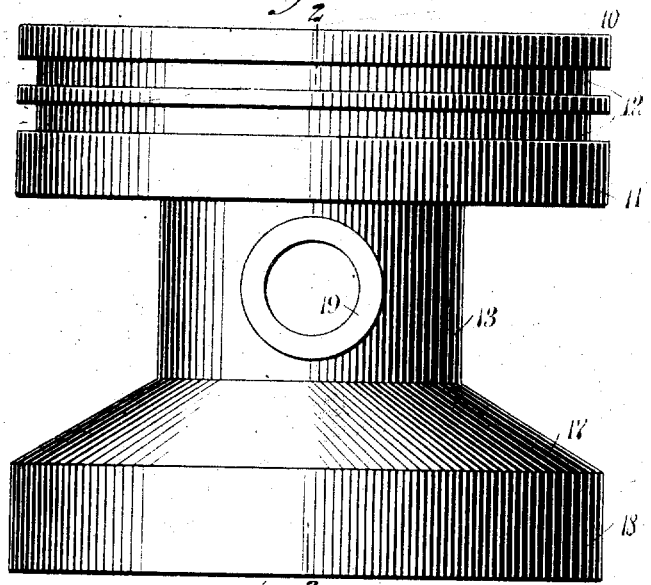
Figure 2:
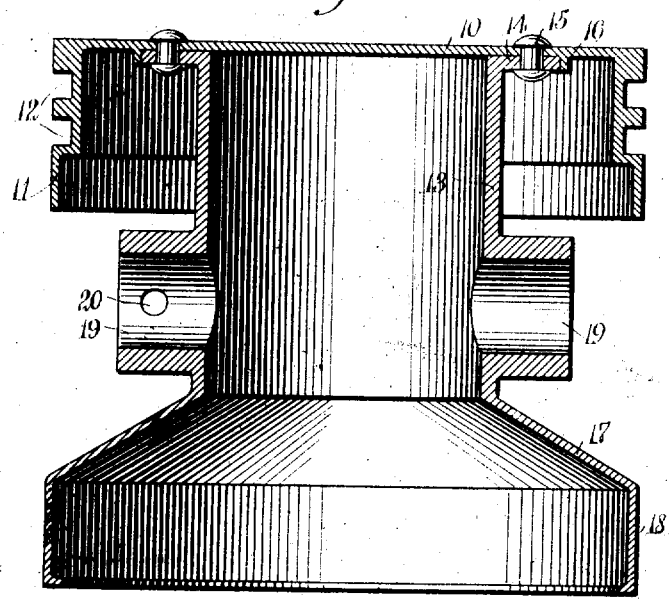

Figure 1 is a side elevation of a piston constructed in accordance with my invention; and Fig. 2 is a longitudinal section on the line 2—2 of Fig. 1.

In my improved construction, I form the piston of two separate pieces or sections rigidly connected together, although the two sections may be formed integral if desired. One of these members has a substantially flat face or circular portion 10, constituting the head of the piston, and at the periphery of this face is an annular skirt or flange 11, in the outer surface of which are formed any desired number of grooves or channels 12 for the reception of packing rings. The other member has a substantially cylindrical trunk or body portion 13, considerably smaller than the flange 11 of the piston and extending concentric with the latter to the under side of the head. The trunk may be secured to the head in any suitable manner, but is preferably provided with an outwardly-extending annular flange 14, which may be held by welding or by rivets 15. The head may have a depending flange 16 on its under side for engagement with the periphery of this flange 14, so as to hold the two parts of the piston concentric. The trunk 13, at its lower end, has an outwardly and preferably downwardly-extending conical flange 17, and at the outer and lower edge of this flange is a cylindrical skirt portion 18 of the same exterior diameter as the skirt or flange portion 11. Both the portions 11 and 18 engage with the inner surface of the engine cylinder, but the two are spaced a considerable distance apart. Intermediate its ends, the trunk 13 is provided with oppositely-disposed outwardly-extending annular bosses 19, adapted to receive the ordinary piston pin. The pin when in place may be held against longitudinal movement by a fastening member extending through a suitable opening 20 in one of the bosses.

In my improved piston, the trunk 13 is preferably of approximately one-half the diameter of the piston, so that the face of the piston is supported on the upper end of the trunk and midway between the center of the face and the periphery of the latter. Thus, the strain upon the face is equally distributed. The bosses 19 may be made considerably shorter than those commonly employed in pistons, and the piston pin may also be made shorter. This reduces the weight of the piston without materially reducing the strength. The flange 18 being of the same diameter as the flange 11, holds the piston against any compression or sheering strain on either flange, and adds strength to the piston. The air chamber encircling the trunk portion and the air chamber within the trunk portion, tend to keep the piston in a cool condition. The two sections may be formed of pressed steel, or, if desired, they might be formed of separate castings, or the piston may be made as a one-piece casting or one-piece stamping.

Having thus described my invention, I claim as new and desire to secure by Letters Patent:

1. A piston having a tubular body portion, a head secured to and closing one end of the tubular body portion, having a piston ring flange surrounding and relatively larger than the tubular body portion and forming in connection with the said tubular body portion, a cooling chamber, and piston pin bosses extending from the opposite sides of the tubular body portion, with the bosses terminating inwardly of the plane of the piston ring flange, and with the cooling chamber freely open at the inner side, whereby the passage of the cooling elements therein from around and about the bosses and against the inner wall of the cylinder is uninterrupted.

2. A piston having a tubular body portion, a head secured to and closing one end of the tubular body portion, having a piston ring flange surrounding and relatively larger than the tubular body portion and forming in connection with the said tubular body portion, a cooling chamber, and a skirt secured to the opposite end of the tubular body portion and of approximately the same diameter as the piston ring flange, the tubular body portion having piston pin bosses extending from the opposite sides thereof and terminating short of the said flange and skirt, the said cooling chamber open at its inner side and in free communication with the space externally of the tubular body between the flange and skirt, and with the inner wall of the cylinder in which the piston is placed.

In testimony whereof I have signed my name to this specification in the presence of two subscribing witnesses.

ERNEST TALBOT.

Witnesses:
C. W. FAIRBANK,
PHILIP D. ROLLHAUS.